Dec. 23, 1969 C. HUTSON 3,485,379
FILTER SCREEN MOUNTING AND CONVEYING MEANS
Filed March 8, 1968 2 Sheets-Sheet 1
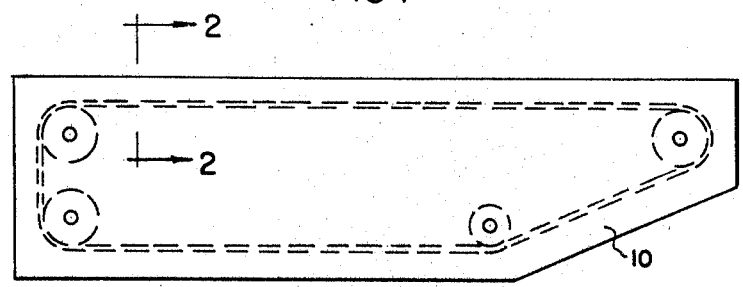
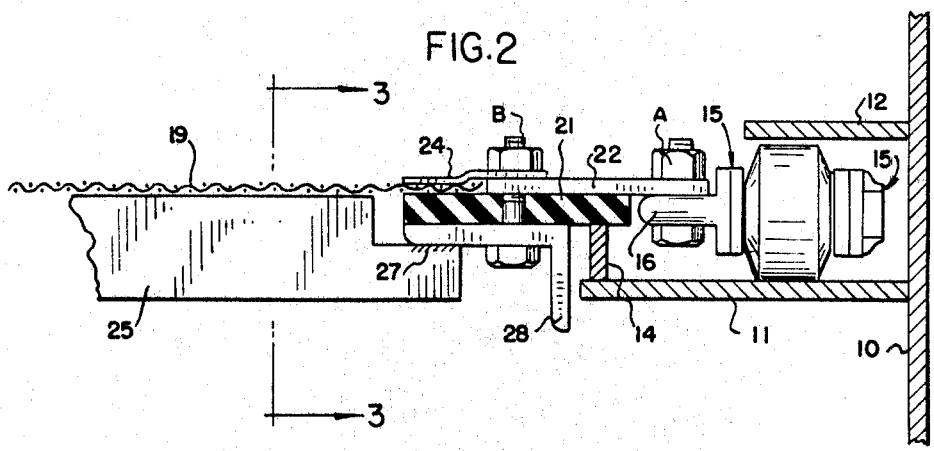
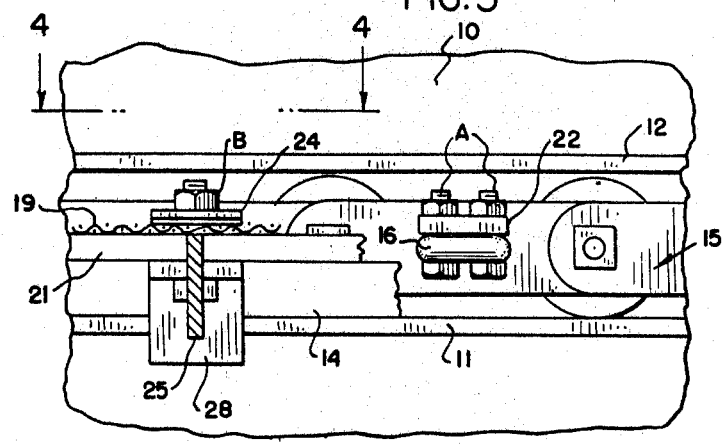
INVENTOR
CYRIL HUTSON
BY Cullen, Sloman, & Cantor
ATTORNEYS Dec. 23, 1969  C. HUTSON  3,485,379
FILTER SCREEN MOUNTING AND CONVEYING MEANS
Filed March 8, 1968  2 Sheets-Sheet 2

INVENTOR
CYRIL HUTSON
BY Cullen, Sloman, & Cantor
ATTORNEYS

United States Patent Office 3,485,379
Patented Dec. 23, 1969

3,485,379
FILTER SCREEN MOUNTING AND
CONVEYING MEANS
Cyril Hutson, Royal Oak, Mich., assignor to
H. R. Black Company, Detroit, Mich.
Filed Mar. 8, 1968, Ser. No. 711,795
Int. Cl. B01d 33/32
U.S. Cl. 210—400                                3 Claims

ABSTRACT OF THE DISCLOSURE

In a filter apparatus of the moving screen type, a novel moving screen filter having a sealing and wear belt for sealing off the screen from the trackway of the construction, and for absorbing all wear of the screen as it moves along the trackway.

---

This application relates to novel filter apparatus and discloses a novel moving screen filter construction for use in the apparatus that is commonly known, an example of which is shown in the patent to H. R. Black, No. 3,197,030 of July 27, 1965.

An object of the invention is to provide a novel moving screen filter construction having a sealing and wear belt against the track side of the screen for facing a sealing rail of the trackway and for cooperating therewith substantially to seal off the trackway from the screen with the sealing belt rather than the screen itself absorbing the wear of the screen as it moves along the trackway.

Still another object of the invention is to provide a simplified and novel moving screen filter construction.

Two embodiments of such construction are shown in the appended drawings as preferred embodiments.

In these drawings:

FIG. 1 is a diagrammatic view of a moving screen filter type apparatus;

FIG. 2 is a horizontal cross-section view of the upper flight only of such apparatus as if on line 2—2 of FIG. 1.

FIG. 3 is an elevation cross-section view of the upper flight only of the screen construction as if on line 3—3 of FIG. 2.

Figure 4:
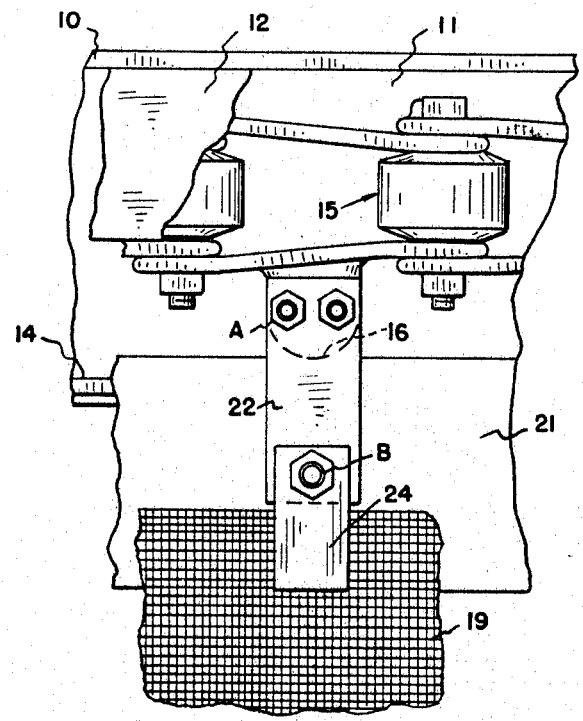
FIG. 4 is a top plan view of a portion of the moving screen construction as if on line 4—4 of FIG. 3.

Referring to the drawings, and particularly to FIG. 2, it will be seen that the drawings show a moving screen type filter apparatus comprising a housing of the type having for each edge of the screen, a trackway comprising a continuous housing side wall 10, a continuous supporting track 11, a continuous hold down rail 12 and a continuous plastic coated sealing rail 14.

Within the trackway moves a continuous link chain arrangement 15 having longitudinally spaced laterally and inwardly projecting screen attachment lugs 16.

The novel moving screen filter construction is secured to such lugs 16 and comprise a continuous filter screen 19, a continuous plastic material sealing and wear belt 21 against the track side of the screen 19 for facing the sealing rail 14 and for cooperating therewith substantially to seal off the trackway 11-12 from the screen 19.

The construction includes longitudinally spaced clip mounting plates 22 facing the other side of the screen 19 and bolted to and connecting the chain link attachment lugs 16 and the sealing and wear belt 21, there being for each lug 16 two bolts A and at each mounting plate 22 where it is bolted to the belt 21, a bolt B.

As part of the plates, though separate therefrom, are longitudinally spaced hold down clips 24 which are bolted to the wear belt 21 by the bolts B and which overlie the screen and cooperate with the belt 21 for clamping the screen 19 and the belt 21 relatively.

In addition, as shown in FIG. 2, the construction includes longitudinally spaced support bars 25 on the track side of the screen bolted to the track side of the wear belt 21 by the bolts B which bolt the wear belt 21 and the clip mounting plates 22 and the clips 24 relatively so as to clamp the wear belt 21 between the plates 22 and the support bars 25, the latter being integrally welded at 27 to angle iron pieces 88 which underlie the belt.

From the foregoing, it will be seen that the unitary construction formed by the screen 19 and the sealing and wear belt 21, and in addition by the other parts such as the clip mounting plates 22, the clips 24, the support bars 25 and the angle iron pieces 28 all may be bolted together by the bolts B to form a unitary sub-assembly which can be joined as a unit to the link chain attachment lugs 16 by the bolts A and may easily be replaced by unloosening the various bolts A and B as desired for replacement of screen 19 or belt 21 or both.

It will also be seen that the wear belt 21 is the only part of the screen construction that engages the trackway at sealing rail 14 and that the sealing belt 21 not only cooperates with such sealing rail 14 to isolate the trackway from the screen itself and vice versa, but also all of the wear of the screen with respect to the trackway takes place where the wear belt 21 engages and rides along the edge of the sealing rail 14.

Figure 5:
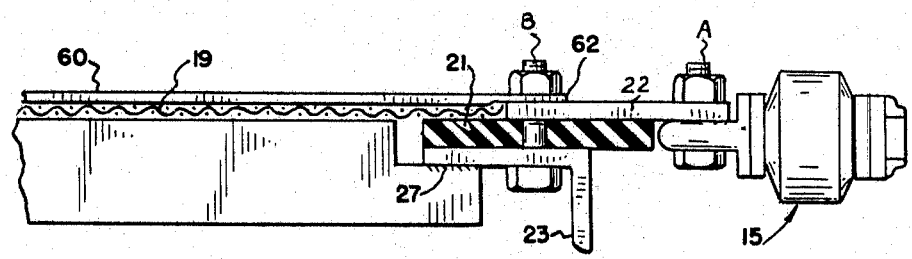
FIG. 5 is a view like FIG. 2, but with the trackway omitted for purposes of clarity and showing a slightly revised form of moving screen construction.

FIG. 5 shows a modification exactly like that of FIG. 2 in major respects, differing therefrom only in the addition of a second set of longitudinally spaced laterally extending support or stiffening bars 60 which at their ends are formed with clip portions 62 integral therewith and which function like the clips 24 of the modification of FIG. 2.

Now having described the novel screen construction herein disclosed, reference should be had to the claims which follow.

I claim:

1. In a moving screen type filter apparatus comprising a housing of the type having for each edge of the screen a trackway comprising a continuous housing side wall, a continuous supporting track, a continuous hold down rail, and a continuous sealing rail on the track;
   a continuous link chain arranged for movement on and along the track and having longitudinally spaced laterally and inwardly projection screen attachment lugs;
   and a moving screen filter construction secured to said lugs;
   the improvement in the screen filter construction comprising;
   a continuous filter screen;
   a continuous plastic material sealing and wear belt against the track side of the screen for facing said sealing rail and for cooperating therewith substantially to seal off the trackway from the screen;

longitudinally spaced clip mounting plates facing the other side of said screen and bolted to and connecting the chain link attachment lugs and said sealing and wear belt;

said plates having longitudinally spaced hold down clips, these being bolted to said wear belt and overlying said screen, cooperating with such belt for clamping the screen and the belt relatively.

2. A construction according to claim 1 including longitudinally spaced support bars on the track side of the screen bolted to the track side of the wear belt by the bolts which bolt the wear belt and the clip mounting plates so as to clamp the wear belt between such plates and such support bars.

3. A construction according to claim 1 including longitudinally spaced protector bars on the clip side of the screen whose ends are formed as the clips.

References Cited

UNITED STATES PATENTS 3,197,030  7/1965  Black _____ 210—400

REUBEN FRIEDMAN, Primary Examiner

T. A. GRANGER, Assistant Examiner